(No Model.)

G. M. WILLIAMS.
PAWL AND RATCHET MECHANISM.

No. 351,238. Patented Oct. 19, 1886.

WITNESSES:
A. P. Grant
L. Douville

INVENTOR:
Geo. M. Williams.
BY John A. Wiederolleim
ATTORNEY.

UNITED STATES PATENT OFFICE.

GEORGE M. WILLIAMS, OF NEWARK, DELAWARE, ASSIGNOR TO THE W. L. NASSAU MANUFACTURING COMPANY, OF SAME PLACE.

PAWL-AND-RATCHET MECHANISM.

SPECIFICATION forming part of Letters Patent No. 351,238, dated October 19, 1886.

Application filed June 24, 1886. Serial No. 206,119. (No model.)

*To all whom it may concern:*

Be it known that I, GEORGE M. WILLIAMS, a citizen of the United States, residing at Newark, in the county of New Castle, State of Delaware, have invented a new and useful Improvement in Pawl-and-Ratchet Mechanism, which improvement is fully set forth in the following specification and accompanying drawings, in which—

Figure 1:
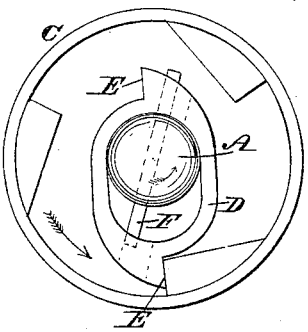
Figure 2:
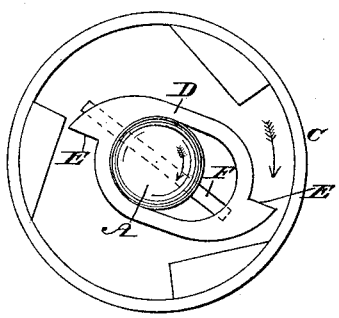
Figure 3:
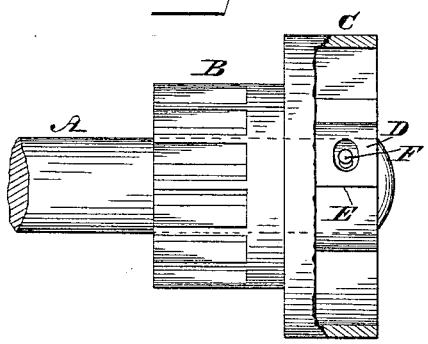
Figure 4:
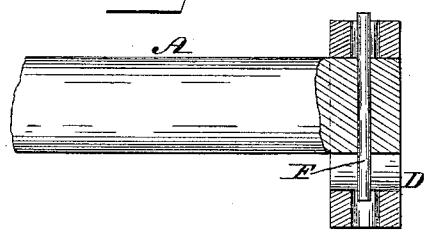
Figure 5:
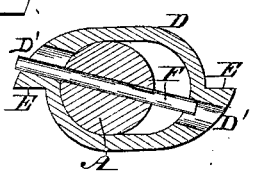

Figures 1 and 2 represent end views of pawl-and-ratchet mechanism embodying my invention. Fig. 3 represents a partial side elevation and partial section thereof. Figs. 4 and 5 represent sections of detached parts.

Similar letters of reference indicate corresponding parts in the several figures.

My invention consists of improvements in pawl-and-ratchet mechanism, as will be hereinafter fully set forth.

Referring to the drawings, A represents a shaft, which passes through a pinion, B, and a circular ratchet or ratchet-box, C, the latter being cast with or otherwise secured to the pinion, the ratchet-teeth being located at intervals on the inner face of the said box C.

D represents a pawl whose body is of the form of a yoke and freely encircles the end of the shaft within the box C, the teeth of the pawl projecting from opposite ends of the yoke, the sides of the teeth forming at the places of junction with the yoke the shoulders E. The opening of the yoke is of greater length than the diameter of the shaft, so that while the pawl rotates with the shaft it may also slide on said shaft or move laterally in opposite directions thereon.

Firmly connected with the end of the shaft is a pin, F, whose ends pass freely through widened openings D' in the tooth portion of the pawl D, serving to retain the pawl on the shaft and guide it in its motions.

When power is applied to the pinion B, as in the case of lawn-mowers, the pinion rotates and causes the rotation of the ratchet-box. One of the teeth of the ratchet engages with the shoulder or end of the adjacent tooth of the pawl, thus causing the rotation of the pawl and the shaft A, power being thereby communicated to the rotary cutter of the mower. When the mower is run back, the teeth of the pawl ride freely over the ratchet-teeth, owing to the opening in the pawl permitting it to slide on the shaft, so that said pawl moves alternately in and out or in opposite directions. When one of the teeth of the pawl reaches a tooth of the ratchet and rides thereon, the other tooth enters the space between adjacent ratchet-teeth; hence there is no engagement of the pawl and ratchet. The shaft is thus at rest, and rotation of the cutter is not occasioned.

It is evident that if power is primarily applied to the shaft the pinion B receives motion by the rotation of the shaft in one direction and remains at rest when the shaft rotates in the opposite direction.

The device presented is strong, durable, inexpensive, and makes but little noise in action.

Having thus described my invention, what I claim as new, and desire to secure by Letters Patent, is—

1. A pawl having a toothed body freely encircling a shaft and provided with teeth at opposite ends, a pin fixed to the shaft, freely entering the body of the pawl, and a ratchet loosely mounted on said shaft, the body being yoke-shaped, having the opening of greater length than the diameter of the encircled shaft, whereby the yoke slides in opposite directions on said shaft and pin, all combined substantially as described.

2. A pawl having a yoke-shaped body freely encircling a shaft and provided with teeth at opposite ends, a pin connected with the shaft, freely entering the teeth of the pawl, and a ratchet loosely mounted on the shaft, the opening of said yoke-shaped body being of greater length than the diameter of the encircled shaft, combined and operating substantially as described.

GEORGE M. WILLIAMS.

Witnesses:
WM. MCKEOWAN,
WILBUR T. WILSON.